Figure 1:
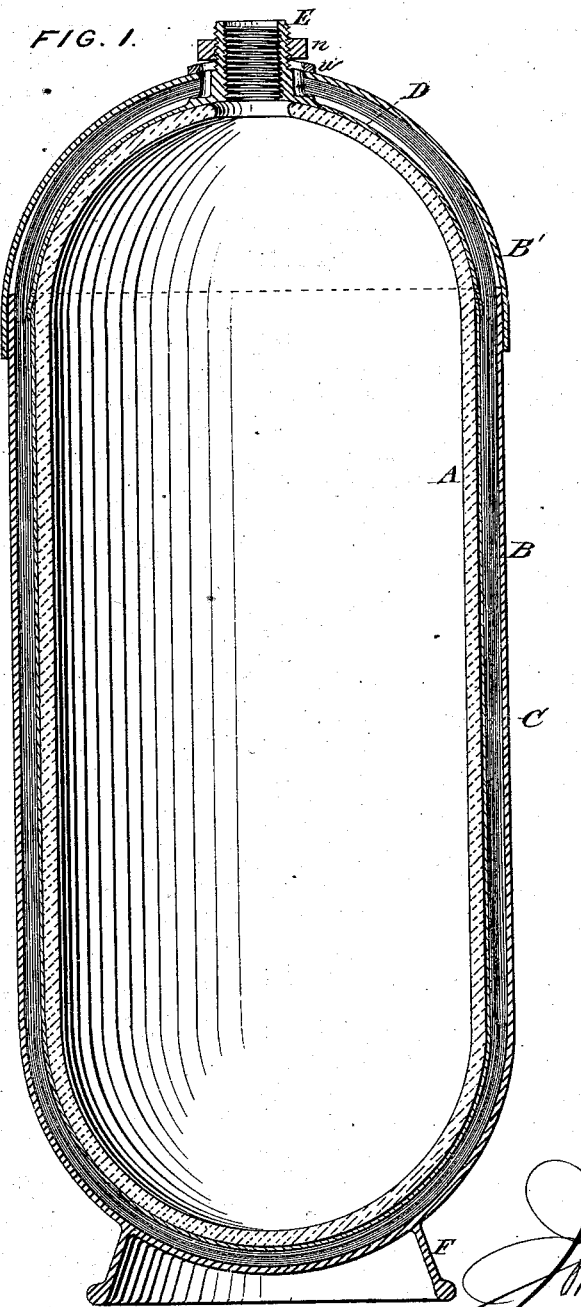

J. MATTHEWS.
Fountain for Soda-Water.

No. 159,432. Patented Feb. 2, 1875.

UNITED STATES PATENT OFFICE.

JOHN MATTHEWS, OF NEW YORK, N. Y.

IMPROVEMENT IN FOUNTAINS FOR SODA-WATER.

Specification forming part of Letters Patent No. 159,432, dated February 2, 1875; application filed August 7, 1874.

CASE B.

*To all whom it may concern:*

Be it known that I, JOHN MATTHEWS, of the city, county, and State of New York, have invented certain new and useful Improvements in Fountains for Soda-Water and other liquids; and I do hereby declare that the following is a full, clear, and exact description thereof, which will enable others skilled in the art to which it pertains to make and use the same, reference being had to the accompanying drawings, and to the letters of reference marked thereon, which form a part of this specification, in which—

Figure 1 is a longitudinal section, partly in elevation.

The object of this invention is to produce a strong fountain, suitable for holding aerated liquids, such as soda and mineral waters which are highly charged with gas.

The invention consists of an exterior jacket or shell of steel or other strong metal, an interior vessel of glass covered with tin or other soft metal, and a non-compressible filling between, the object of said filling being to transmit all the pressure of the gas to the strong metal shell, and thus prevent the bursting of the glass vessel and the soft-metal covering of the glass vessel.

The following description will enable others to make and use my invention.

In the drawing, A is the glass vessel, which is formed by the process of blowing or otherwise, of such size relatively to the outer case as to leave about half an inch, more or less, between it and the outer case or shell. B is the main portion of the shell; and B', the top portion, which is joined to the portion B by a solder-joint after all the parts have been put together. C is a non-compressible filling, which I prefer to make of india-rubber or other similar material. D is a covering of pure sheet-tin or other similar metal, that fits snugly over the glass vessel, and is connected with the plug E, which forms the bung or outlet. A nut, *u*, and washer *w* clamp the parts together. F is the foot to support the fountain in an upright position.

The glass vessel A, having been made of suitable form and thickness of strong glass, is first covered by a closely-fitting sheet-envelope. A sheet of non-conducting material is then interposed between the glass vessel and the place where the final joint is to be soldered. The open end of the sheet-tin envelope is then fitted on the glass vessel filled with warm or hot water, and the joint which unites the upper and lower portions of the envelope then soldered with an easily-fusible alloy. A jacket of elastic and non-compressible substance, preferably india-rubber, is then drawn over the tin envelope of the glass, which is to form the lining of the steel shell. The whole is then closely fitted into the portion B of the steel jacket.

The part B' is united to the part B by a solder-joint, in the manner described in my Patent No. 128,411, dated June 13, 1872, or by the process which I have described in another specification of even date with this.

In this form of fountain the water or other aerated liquid does not come in contact with the packing material, the pressure being between the tin lining and the exterior of the glass vessel, and also on the interior of the glass vessel.

The space between the outside of the glass and the tin envelope is reduced to a minimum, and but a thin film of liquid, only sufficient to balance the pressure on the interior of the glass vessel, is allowed to enter between the tin envelope and the glass vessel.

The filling or packing, when made of rubber, vulcanized or otherwise, is a good non-conducter of heat. It is also a perfect protection to the glass. It is one of the most incompressible materials known; and, if the intervening space between the steel or other metallic shell and the glass vessel is carefully packed, all the pressure will be transmitted from the exterior of the glass to the shell, and there will be no danger of rupturing the sheet-tin lining.

I do not claim a steel fountain with a sheet-tin lining, nor a glass vessel in a metallic case, with valves in the glass, so as to transmit the pressure to the shell; but, Having described my invention, what I claim, and desire to secure by Letters Patent, is—

A reservoir or fountain for aerated liquids, composed of a steel or other strong metallic shell, a glass vessel with a sheet-metal envelope, and an elastic non-compressible filling or packing between, substantially as described.

In testimony that I claim the foregoing as my own, I affix my signature in presence of two witnesses.

JOHN MATTHEWS.

Witnesses:
S. A. CURTIS,
W. D. SLOAN.